United States Patent [19]

Tomori

[11] Patent Number: 4,518,239

[45] Date of Patent: May 21, 1985

[54] INTERMEDIATE ADAPTER FOR CAMERA

[75] Inventor: Yasumasa Tomori, Tokyo, Japan

[73] Assignee: Asahi Kogaku Kogyo Kabushiki Kaisha, Tokyo, Japan

[21] Appl. No.: 611,287

[22] Filed: May 17, 1984

[30] Foreign Application Priority Data

Jun. 2, 1983 [JP] Japan .................... 58-98624

[51] Int. Cl.³ ............................................. G03B 17/00
[52] U.S. Cl. .................... 354/286; 358/225
[58] Field of Search ............... 352/137; 354/286; 358/225, 229

[56] References Cited

U.S. PATENT DOCUMENTS

| | | | |
|---|---|---|---|
| 3,968,504 | 7/1976 | Komine | 354/286 |
| 4,162,823 | 7/1979 | Jorgensen | 354/286 |
| 4,382,671 | 5/1983 | Kukino et al. | 354/286 |
| 4,466,019 | 8/1984 | Sakashita | 354/286 |

Primary Examiner—Russell E. Adams

Attorney, Agent, or Firm—Sughrue, Mion, Zinn, Macpeak & Seas

[57] ABSTRACT

An intermediate adapter for coupling an interchangeable lens having a small flange focal distance, such as an interchangeable lens originally intended for use with a single-lens reflex camera, to a camera body having a large flange focal distance. The adapter includes an aperture device replacing a stop of the interchangeable lens and which is driven by an electric motor. An aperture value data transmitting member transmits aperture value data set by an aperture value setting member provided for the interchangeable lens to the aperture device. An aperture opening degree regulator sets an aperture opening degree to a set aperture value according to the aperture value data transmitted in an aperture driving operation performed by the electric motor. A video changeover device releases the aperture opening degree regulator to allow the aperture device to operate in a range of a fully open state to a fully closed state.

8 Claims, 9 Drawing Figures

INTERMEDIATE ADAPTER FOR CAMERA

BACKGROUND OF THE INVENTION

This invention relates to an intermediate adapter used to couple interchangeable lenses and camera bodies of different flange focal distances (distance between the flange surface and focal phase), thus permitting the use of an interchangeable lens of large flange focal distance with a camera body having a small flange focal distance.

For instance, when it is required to use an interchangeable lens originally intended for use with a single-lens reflex camera having a larger flange focal distance and image size with a video camera, it is necessary to compensate for the difference in flange focal distance by mounting an intermediate adapter therebetween. However, a conventional intermediate adapter does not allow the correlative operation of the interchangeable lens and the video camera body. Accordingly, heretofore it has been impossible to perform a motion picture photographing operation in an automatic aperture control mode in such a situation, and it is also impossible to use the interchangeable lens in an automatic aperture control mode even for still picture photographing operation. In other words, it is impossible to continuously operate (adjust the amount of opening of) the aperture according to the brightness of the object, and it is also impossible to carry out a preset automatic aperture control operation in which the aperture is normally fully opened and decreased to an aperture value used only in a still picture photographing operation.

SUMMARY OF THE INVENTION

An object of this invention thus is to provide an intermediate adapter which, in the case where a lens for a single-lens reflex camera is used with a video camera, permits a motion picture photographing operation in an automatic aperture control mode and a still picture photographing operation in a preset automatic aperture control mode.

A specific feature of the invention resides in an intermediate adapter for a camera which comprises: aperture device which is used in place of the stop of an interchangeable lens; aperture value data transmitting means for transmitting aperture value data set by the aperture value setting member of the interchangeable lens to the aperture device; aperture opening degree regulating means for regulating the aperture opening degree to a set aperture value according to the aperture value data thus transmitted in the aperture driving operation of an electric motor; and video changeover means for releasing the aperture opening degree regulating means to permit the aperture device to operate in the range of the fully open state to the fully closed state, thus allowing a motion picture photographing operation in an automatic aperture control mode.

DESCRIPTION OF THE PREFERRED EMBODIMENTS

The invention will be described preferred embodiments thereof.

Figure 1:
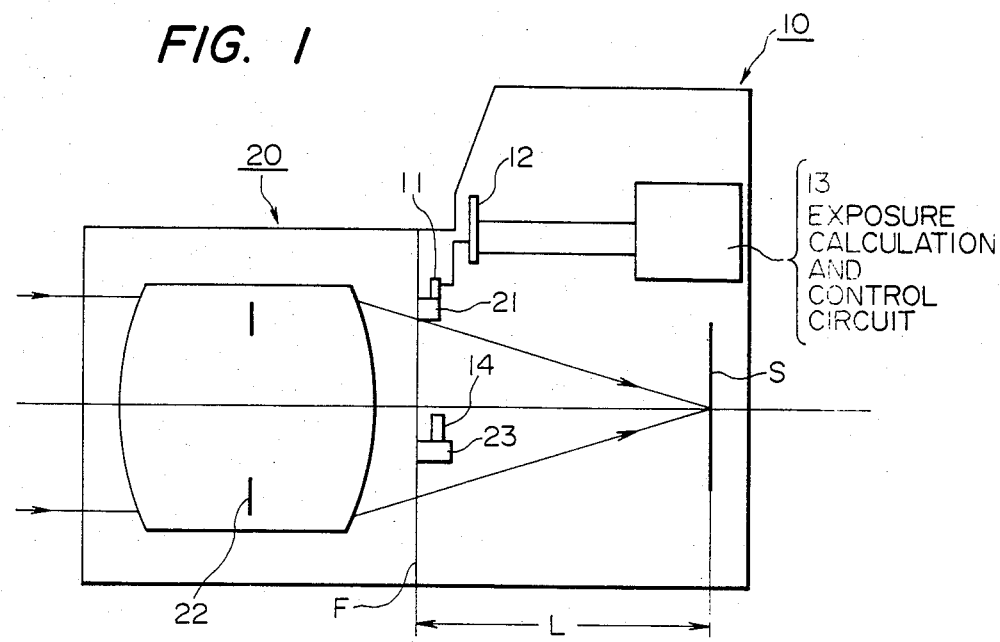
FIG. 1 is a diagram showing the flange focal distance of a single-lens reflex camera and outlining the arrangement of the camera.

FIG. 1 shows the body 10 of a single-lens reflex camera and an interchangeable lens 20 mounted on the body 10. In FIG. 1, reference character L designates a flange focal distance; F, a flange plane; and S, a focal plane. The interchangeable lens 20 has a conventional aperture value setting member (aperture ring). As the aperture value setting member is turned, an aperture value transmitting member 21 is turned, and accordingly an aperture value relaying member 11 on the body 10 is turned. The turning of the aperture value relaying member 11 changes the resistance of a variable resistor 12 so that electrical data corresponding to the set aperture value is obtained. The electrical data is applied to an exposure calculation and control circuit 13 in the body 10, as a result of which a correct exposure value is calculated thereby and a suitable shutter speed is determined. In this embodiment, the stop 22 of the interchangeable lens 20 is a normally closed stop which is energized to close. Therefore, the minimum aperture is provided before an aperture operating (opening and closing) member 23 is operated.

When the lens 20 is mounted on the body 10, an aperture release member 14 on the body 10 engages the aperture operating member 23 to maintain the stop 22 open. When the shutter is released, the aperture release member 14 is retracted to the position where it will not interfere with the aperture operating member 23. Thus, the lens stop 22 is operated to the set aperture value, and the correct exposure value is obtained. The lens stop 22 may be a normally open stop which maintains the aperture fully open when the aperture operating member 23 is not in operation. In this case, the release member 14 should be an aperture decreasing member which is turned to decrease the aperture when the shutter is released.

Figure 2:
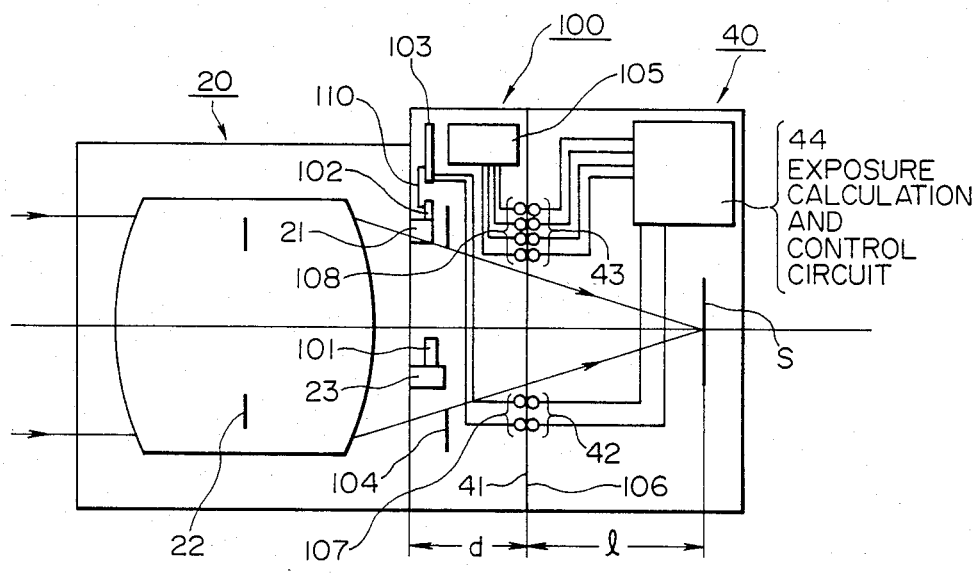
FIG. 2 is an optical system diagram showing an example of an intermediate adapter according to the invention which is connected between an interchangeable lens and a camera body.
Figure 3:
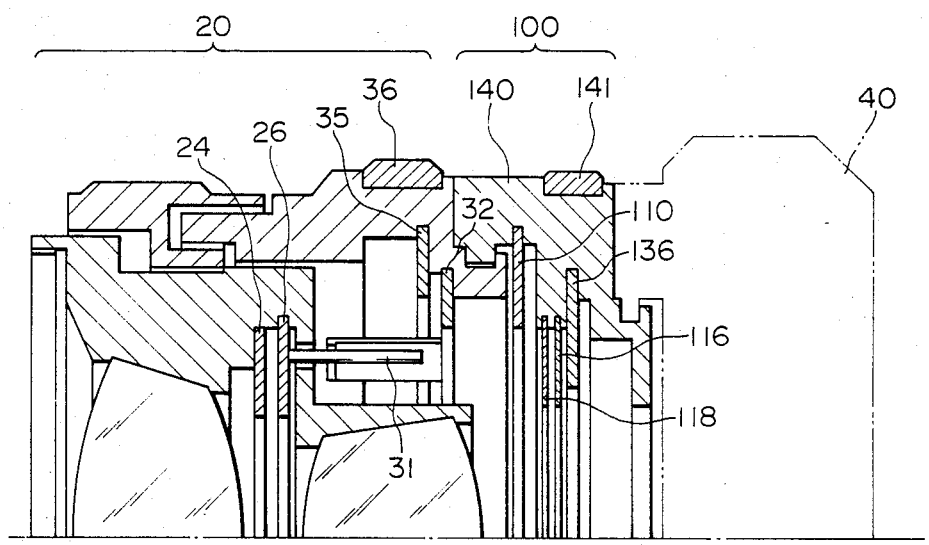
FIG. 3 is a diagram showing essential components in FIG. 2.
Figure 4:
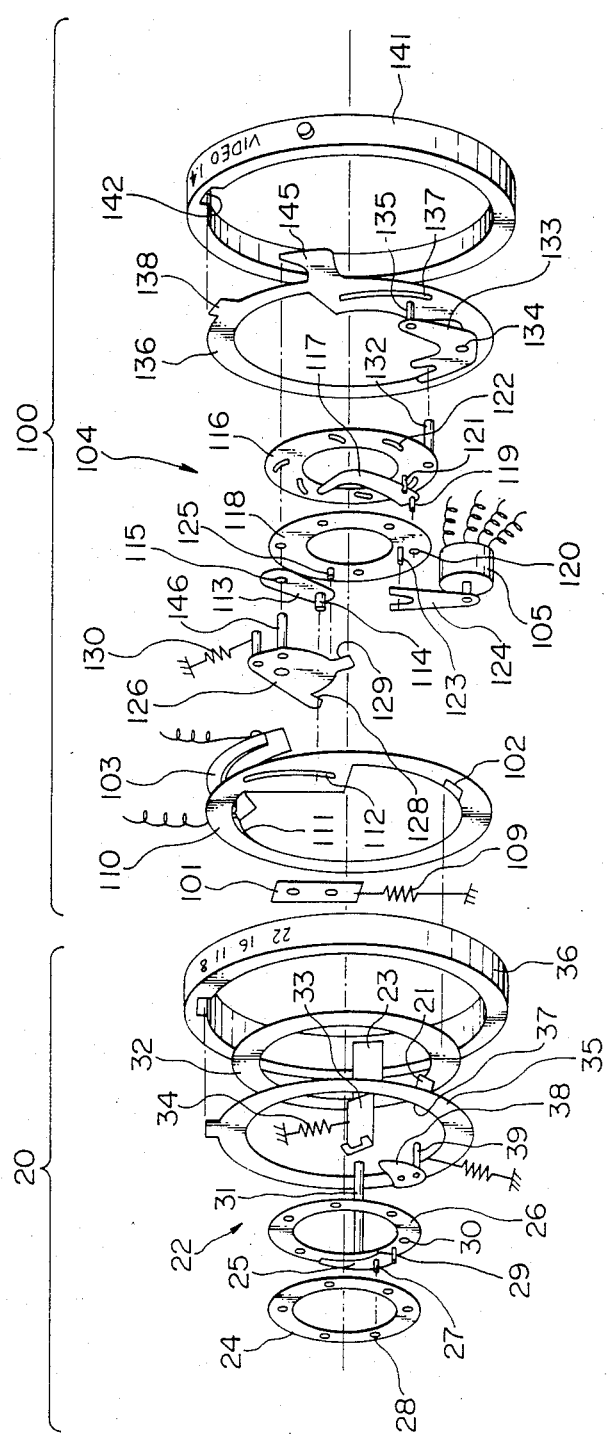
FIG. 4 is an exploded perspective view showing essential components in FIG. 2.

The above-described single-lens reflex camera is an ordinary one. The invention provides an intermediate adapter 100 which allows the use of the interchangeable lens 20 in an automatic aperture control mode on a camera body (such as a video camera body) 40, the flange focal distance and picture size of which are smaller than those of the single-lens camera body 10. FIG. 2 shows the essential components of the interchangeable lens, the adapter and the camera body, and FIGS. 3 and 4 show them in more detail.

As is apparent from FIG. 2, the length d of the intermediate adapter 100 in the optical axis direction, that is, the thickness of the adapter 100, is the difference between the flange focal distances L and l. Under this condition, the lens 20 can be optically used with the camera body 40. In FIG. 2, reference character s designates the focal plane of the camera body 40.

The fundamental arrangement of the intermediate adapter 100 will be described with reference to FIG. 2. The adapter 100 has a full-aperture maintaining member 101 which, when the adapter 100 is engaged with the interchangeable lens 20, engages the aperture release lever 23 of the lens 20 to maintain the lens stop 22 fully open. In the case where the interchangeable lens 20 has a normally open lens stop, the lens stop is maintained fully open until its aperture operating (opening and closing) member is operated. Under the condition that the interchangeable lens is coupled to the intermediate adapter, no external force is applied to the aperture operating member. In addition, in the interchangeable lens with the normally open lens stop, the lens stop is, in general, maintained fully open even when the aperture setting member is turned. Therefore, in the case where the interchangeable lens having the normally open lens stop is used, it is not necessary to provide the full aperture maintaining member 101. Thus, the provision of the full-aperture maintaining member depends on whether the stop 22 of the interchangeable lens 20 is a normally open lens stop or a normally closed lens stop. The lens stop should be maintained fully open, thus suspending the performance of its function.

An aperture value relay member 102 and a variable resistor 103 in FIG. 2 correspond respectively to the aperture value relaying member 11 and the variable resistor 12 in the body 10 in FIG. 1. The aperture value relaying member 102 is operated by rotation of the aperture value transmitting member 21 of the interchangeable lens 20 so that the resistance of the variable resistor 103 is changed according to the set aperture value.

The intermediate adapter 100 has its own aperture device 104 which is driven by a motor 105. The intermediate adapter 100 has a flange surface 106 which faces the camera body 40, and the camera body 40 has a flange surface 41 which is brought into contact with the flange section 106. Aperture data electrical contact sets 107 and 42 and motor control electrical contact sets 108 and 43 are provided on the flange surfaces 106 and 41, respectively. The contact sets 107 and 42 and the contact sets 108 and 43 are electrically connected together when the flange surfaces 106 and 41 are brought into contact with each other.

Electrical data corresponding to the set aperture value of the variable resistor 103 is applied through the aperture data electrical contact sets 107 and 42 to an exposure calculating circuit 44 in the camera body 40. The exposure calculation and control circuit 44 determines a shutter speed according to the electrical data representative of a set aperture value and to apply an operating signal to the motor 105 through the electrical contact sets 43 and 108 at the time of shutter release.

With the interchangeable lens 20 coupled through the intermediate adapter 100 to the camera body 40, an aperture value can be set by the aperture value setting member of the interchangeable lens 20, and automatic aperture control can be obtained by the aperture device 104 of the intermediate adapter 100. Therefore, in the case where the camera body 40 is a video camera body, a still picture photographing operation can be carried out in an automatic aperture control mode. In the motion picture mode, a video changeover device is used to operate the aperture device 104 in the range of the fully open state to the fully closed state, i.e., the degree of opening of the aperture device 104 is changed by the motor 105 according to the brightness of the object.

The intermediate adapter of the invention will be described in more detail with reference to FIGS. 3 and 4. The lens stop 22 of the interchangeable lens 20 includes an aperture support ring 24, aperture blades 25 and an aperture operating (opening and closing) ring 26. In FIG. 4, only one aperture blade 25 is shown for simplification of illustration. The fulcrum pin 27 of each aperture blade 25 is rotatably inserted into a fulcrum hole 28 in the aperture support ring 24, and the rotary pin 29 is inserted into an operating (opening and closing) cam hole 30 in the aperture operating ring 26. A rotary pin 31 is affixed to the aperture operating ring 26. The rotary pin 31 is engaged with the operating arm 33 of an aperture release ring 32. The aperture release ring 32 urges the aperture operating ring 26 to decrease the aperture with the aid of a tension spring 34 so that the lens stop 22 is energized for the minimum aperture at all times. The aperture release lever 23 protrudes from the aperture release ring 32. An aperture cam plate 35 turns together with an aperture ring (or aperture value setting member) 36. The cam surface 37 is integral with the above-described aperture value transmitting member 21. The cam surface 37 engages with a regulating pin 39 or a regulating pin 38 so that the stop position of the aperture operating ring 26 is regulated to a diameter corresponding to the set aperture value.

The full-aperture maintaining member 101 of the intermediate adapter 100 is so positioned that, when the interchangeable lens 20 is mounted on the adapter 100, the member 101 engages the aperture release lever 23 to release the lens stop 22. Since different interchangeable lenses (20) may have different aperture release lever (23) positions, the full-aperture maintaining member 101 is so designed that it is movable and is urged by a protective tension spring 109. The elastic force of the tension spring 109 is smaller than that of the tension spring 34 for the aperture release ring 32. Therefore, in mounting the interchangeable lens 20 on the intermediate adapter 100, the full-aperture maintaining member 101 can make the lens stop 22 fully open. When the lens stop 22 is fully opened during the mounting operation, the full-aperture maintaining member 101 displaces while bending the tension spring 109. In the case of an interchangeable lens having a normally open stop, it is not necessary to use the full-aperture maintaining member.

The aperture value relaying member 102 engaging the aperture value transmitting member 21 is integral with an aperture value relaying ring 110, which is turned by a spring (not shown) in such a manner that the aperture value relaying member 102 abuts against the aperture value transmitting member 21. A brush 111 is connected to the aperture value relaying ring 110 in such a manner that it is slidably in contact with the variable resistor 103. Thus, the amount of rotation of the aperture value relaying ring 110, i.e., the aperture value set for the interchangeable lens 20, is converted into electrical data by the variable resistor 103. A cam groove 112 is formed in the aperture value relaying ring 110. The regulating dowel 114 of a counterlever 114 is engaged with the cam groove 112. The cam groove 112 turns the counterlever 113 about its shaft 115 according to the set aperture value so that the regulating dowel 114 is held at a position corresponding to the aperture value.

The aperture device 104 is similar in arrangement to the lens stop 22 in the interchangeable lens 20; i.e., it is made up of an aperture support ring 116, aperture blades 117, and an aperture operating (opening and closing) ring 118. The fulcrum pin 119 of each aperture blade 120 is rotatably inserted into a fulcrum hole 120 in the aperture operating ring 118, and the rotary pin 121 is inserted into an operating cam hole 122 in the aperture support ring 116. Therefore, as the aperture operating ring 118 and the aperture support ring 116 are turned relative to each other, the degree of opening of the aperture device 104 is changed. An operating (opening and closing) pin 123 is affixed to the aperture operating ring 118 and is engaged with a drive lever fixedly secured to the rotary shaft of the motor 105. Upon application of current to the motor 105, the rotation of the motor 105 is applied through the drive lever 124 and the operating pin 123 to the aperture operating ring 118 so that the latter is turned so as to close the aperture device 104. The drive lever 124 is normally urged by a spring (not shown) to turn the aperture operating ring 118 to open the aperture.

A locking pin 125 is affixed to the aperture operating ring 118. The locking pin 125 converts the amount of rotation of the aperture operating ring 118 into data corresponding to the set aperture value in cooperation with the regulating dowel 114 affixed to the counter-lever 113 and an operating lever 126 which is pivotally mounted in such a manner as to be coaxial with the shaft 115 of the counterlever 113. This will be described with reference to FIG. 3 in more detail.

The operating lever 126 has an interlocking surface 128 which is engaged with the regulating dowel 143 of the counterlever 113 and a regulating surface 129 engaging the locking pin 125. The operating lever 126 is urged by a tension spring 130 so that the interlocking surface 128 is kept in abutment with the regulating dowel. The position of the regulating dowel 114, as described above, is determined according to the aperture value set by the aperture ring 36 on the interchangeable lens 20, and accordingly the position of the regulating surface 129 is determined thereby. Therefore, when the aperture operating ring 118 is turned during the aperture decreasing operation, the locking pin 125 reaches the regulating surface 129 quickly so that the degree of opening of the aperture is regulated. The tension spring 130 is not bent by the aperture decreasing force of the motor 105, and therefore the position of the regulating surface 129 is maintained unchanged during the aperture decreasing operation. The above-described components regulate the aperture opening degree.

Next, an arrangement for correcting the full-aperture F value of the aperture device 104 according to the full-aperture F value of the interchangeable lens 20, and a video changeover device for permitting a video photographing operation will be described. A correcting pin 132 is affixed to the aperture support ring 116. The correcting pin 132 is engaged with one arm of an intermediate lever 133. The intermediate 133 is rockable about a shaft 134. A regulating pin 135 extends from the other arm of the intermediate lever and is inserted into a cam groove formed in a correcting cam plate 136. Therefore, as the correcting cam plat 136 is turned, the aperture support ring 116 is turned through the intermediate lever 133, thus changing the full-aperture F value. The correcting cam plate 136 has an interlocking protrusion 138. An F-value correction and video changeover ring 141 is rotatably fitted on an intermediate adapter fixing ring 141. The ring 141 has a recess 142 into which the interlocking protrusion 138 is inserted. The full-aperture F value of the aperture device 104 can be changed by turning the F-value correction and video changeover ring 141. Full-aperture F values are marked on the F-value correction and video changeover ring 141.

The cam groove 137 and the intermediate lever 133 are used to increase the angle of rotation of the aperture supporting ring 116 and to transmit it to the F-value correction and video changeover ring 141. Therefore, the cam groove and the intermediate lever can be omitted if the angle of rotation of the aperture support ring 116 is made equal to that of the F-value correction and video changeover ring 141. However, in general, if their angles of rotation are made equal, the angle of rotation of the F-value correction and video changeover ring 141 becomes excessively small. On the contrary, if the angle of rotation of the aperture support ring 116 is large, then the angle of rotation of the aperture operating ring 118 also becomes large. Therefore, the operating angle of the drive lever 124 is increased, the aperture control speed is decreased, and the range of correctable F values is reduced. This is undesirable. It is desirable that the aperture device 104 be a so-called "equidistance aperture device" in which the aperture operating ring 118 is turned through the same angle to change an aperture value to the next higher or lower value. In this case, the cam groove 112 of the aperture value relaying ring 110 can be used irrespective of the rotational angle enlarging factor provided by the cam groove 137 and the intermediate lever 133.

The F-value correction and video changeover ring 141 can place the aperture device 104 in a "video" state irrespective of the set aperture value of the interchangeable lens 20. This function is achieved by releasing the locking pin 125 of the aperture operating ring 118 from the operating lever 126 when the F-value correction and video changeover ring 141 is turned to a predetermined position, such as a video changeover position, by setting the index of the fixing ring 140 to a mark "VIDEO".

Figure 5:
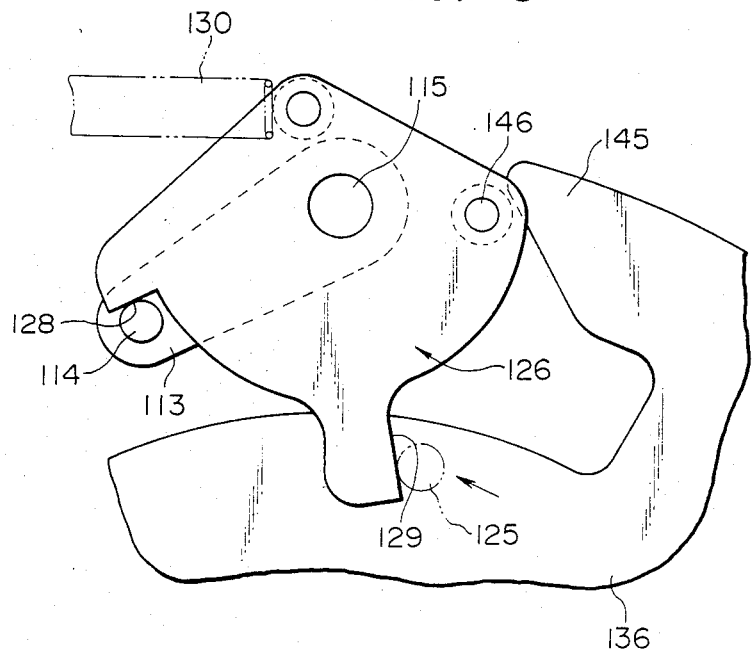
FIGS. 5 and 6 are front views showing different states of an example of a video changeover device.
Figure 6:
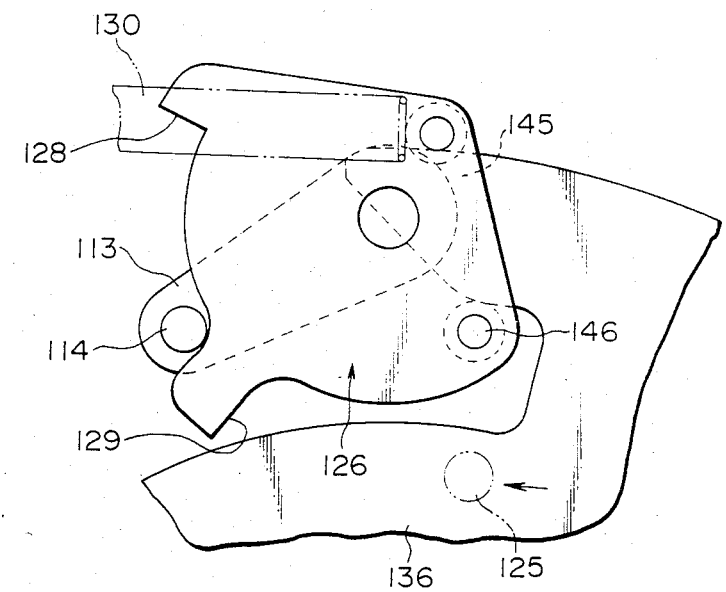

The correcting cam plate 136 turning together with the F-value correction and video changeover ring 141 has a release protrusion 145. An interlocking pin 146 is embedded in the operating lever 126 and is engaged with the release protrusion 145. As long as the F-value correction range is used, the release protrusion 145 and the interlocking pin 146 will not interfere with each other. However, if the F-value correction and video changeover ring 141 is turned to the video changeover position, the protrusion 145 abuts against the pin 146, so that the operating lever 126 is turned against the elastic force of the tension spring 130, i.e., the position regulating surface 129 is retracted from the movement space of the locking pin 125, as shown in FIGS. 5 and 6. Accordingly, the aperture operating ring 118 can be turned until the aperture device is placed in the normally closed state; i.e., the aperture device can be continuously opened or closed by the motor 105.

As is apparent from the above description, the video changeover operation can be carried out irrespective of the aperture value, i.e., the position of the counterlever 113.

The electrical signal from the variable resistor 103 is applied through the electrical contact sets 107 and 42 to the exposure calculation and control circuit 44 in the camera body 40 (FIG. 2), in response to which the circuit 44 provides a motor drive signal. The motor drive signal is applied through the electrical contact sets 43 and 108 to the motor 105. Elements necessary for a still camera or video camera, such as the above-described exposure calculation and control circuit 44, photometering unit, shutter, film or tape feeding unit, viewfinder and power source (not shown) are provided in the camera body 40. Each of the motor control electrical contact sets 108 and 43 has four terminals. A drive signal and a speed control signal are applied to the motor in the motion picture photographing operation therethrough. Therefore, in the case where no wiring is required for the speed control, each of the electrical contact sets may have only two terminals.

When the intermediate adapter 100 is set between the camera body 40 and the interchangeable lens 20, the aperture device 22 is placed in the full-aperture state by the full-aperture maintaining member 101. As the aperture ring 36 of the interchangeable lens 20 is turned to set an aperture value, the aperture cam plate 35 is turned. The rotation of the aperture cam plate 35 is transmitted through the aperture value transmitting member 21 and the aperture value relaying member 102 to the aperture value relaying ring 110 to turn the latter, thereby to turn the brush 111, as a result of which the variable resistor 103 provides a resistance corresponding to the aperture value. Therefore, electrical data (aperture value data) corresponding to the resistance thus provided is applied through the aperture data electrical contact sets 107 and 42 to the exposure calculation and control circuit 44 in the camera body 40.

As the aperture value relaying ring 110 is turned, the regulating surface 129 of the operating lever 126 is displaced by means of the cam groove 112, the dowel 114, and the interlocking surface 128 of the operating lever 126, so that the aperture value data is mechanically transmitted to the aperture device 104. On the other hand, in the camera body 40, a shutter speed is calculated from the aperture value data thus transmitted and the photometric data of the object. Upon release of the shutter, current is applied through the motor control electrical contact sets 43 and 108 to the motor 105. As a result, the aperture operating ring 118 is turned with the aid of the drive lever 124 and the operating pin 123 until the locking pin 125 abuts against the regulating surface 129. That is, the aperture operating ring 118 is turned through the angle corresponding to the set aperture value which has been regulated by the regulating surface. Thereafter, the shutter is opened for the predetermined period of time, thus completing the exposure. Then, the application of current to the motor 105 is suspended so that the aperture device 104 is opened by the spring again.

The above-described operation are for a still picture photographing operation. If it is necessary to correct the F value of the intermediate adapter 100 according to the F value of the interchangeable lens 20, then the F-value correction and video changeover ring 141 is turned. As described above, the correcting cam plate 136 is turned, and the aperture support plate 116 is turned through the intermediate lever 133 and the correcting pin 132, so that the full-aperture F value is corrected. F values are suitably marked on the F-value correction and video changeover ring 141.

In the case where a motion picture photographing operation is carried out (the camera body 40 is a video camera), the F-value correction and video changeover ring 141 is turned to the video changeover position. Thereupon, the release protrusion 145 of the correcting cam plate 136 pushes the interlocking pin 146 of the operating lever 126 so that the regulating surface 129 of the operating lever 126 is retracted from the aperture opening degree regulating position of the aperture device 104. Therefore, the aperture deice 104 can be opened and closed in the range of the fully open state to the fully closed state. In response to the signal from the photometering unit, the exposure calculation and control circuit 44 in the camera body 40 outputs a signal according to the brightness of the object. The output signal is applied, as an operating signal including the drive signal and the control signal, to the motor 105, so that the degree of opening of the aperture device 104 is continuously changed by the motor 105. Thus, a motion picture can be taken by using an interchangeable lens 20 for a single-lens reflex camera.

Figure 7:
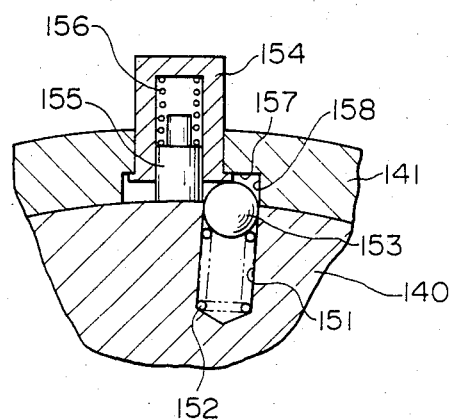
FIGS. 7 and 8 are cross-sectional views showing different states of a locking device for an F-value correction and video changeover ring.
Figure 8:
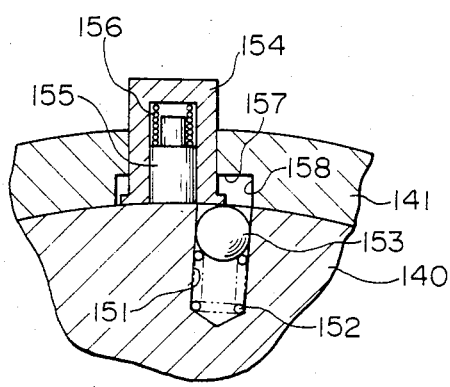

It is not necessary to turn the F-value correction and video changeover ring 141 to correct the F value until the interchangeable lens 2 is changed. It is not necessary to turn the ring 141 to the "VIDEO" position until the intermediate adapter is connected to a video camera It is undesirable that the ring 141 to be carelessly turned from its set position. FIGS. 7 and 8 show an example of an arrangement for locking the F-value correction and video changeover ring 141. A hole 151 is formed in the fixing ring 140 extending radially. A ball 153 is inserted into the hole 151 and urged radially outwardly by a compression spring 152. A locking releasing button 154 is held by the F-value correction and video changeover ring 141 in such a manner that it is radially slidable. A locking pin 155 is slidably fitted in the button 154. A compression spring 156 is provided between the locking pin 155 and the button 154 so that the latter is normally urged outwardly and a locking hole for receiving the ball 153 is formed between the locking pin 155 and the wall 158 of a hole 157 in the ring 141. Therefore, in the locking state shown in FIG. 7, the ring 141 cannot be turned. After the ball 153 is pushed into the hole 151 by depressing the button 154 as shown in FIG. 8, the ring 141 can be turned. A locking device composed of the hole 151, the compression spring 152 and the ball 153 may be provided for all F values and the video changeover position, or it may be provided only before the video changeover position as the case may be.

In the above-described embodiment, the video changeover operation is effected by turning the F-value correction and video changeover ring 141; however, it may be achieved by means other than the ring 141. For instance, if a member having the release protrusion 145 is provided separately from the correcting cam plate 136, the same effect can be obtained by moving the member in the video changeover operation.

In the above-described embodiment, the aperture device 104 is a normally open aperture device which is maintained open until an external force is applied thereto. Therefore, in a still picture photographing operation, a preset automatic aperture control operation can be achieved. However, in the case where the intermediate adapter is used for a video camera, the same effect can be obtained with a normally closed aperture device.

Figure 9:
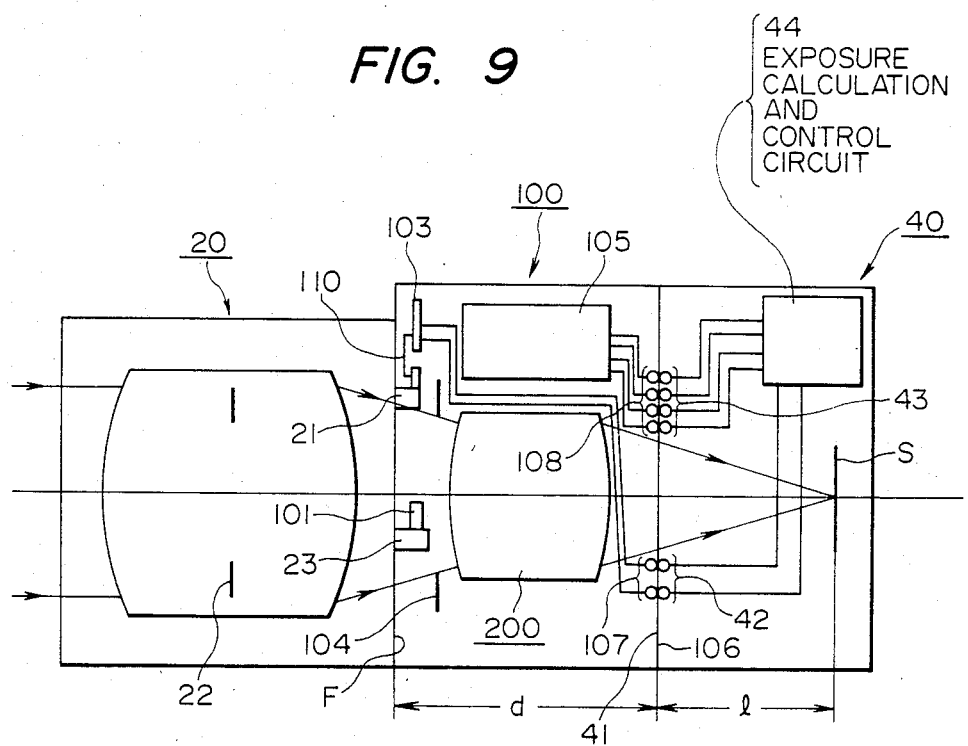
FIG. 9 is an optical system diagram showing another example of the intermediate adapter according to the invention, similar to FIG. 2.

The thickness d of the intermediate adapter of the invention is obtained by subtracting the flange focal distance l of the camera body from the flange focal distance L of the interchangeable lens 20, as described before. However, depending on the flange focal distance, it may be impossible to make the thickness d sufficiently large. FIG. 9 shows another example of an intermediate adapter according to the invention in which the thickness d can be sufficiently large. A specific feature of the intermediate adapter in FIG. 9 is that an optical system (relay lens) 200 is provided in the intermediate adapter 100 so that the optical path from the flange surface F of the interchangeable lens 20 to the focal plane s of the camera body 40 is increased. The provision of the relay lens 200 for increasing the optical path length in the intermediate adapter 100 makes it possible to freely set the thickness d of the intermediate adapter 100. Accordingly, elements built into the intermediate adapter 100, for instance, the aperture device 104, can be designed with a high degree of freedom. The other components are the same as those in the first example of the intermediate adapter described above.

As is apparent from the above description, in the case of camera systems of different flange focal distances, the employment of the intermediate adapter of the invention makes it possible to combine an interchangeable lens of larger flange focal distance with a camera body of smaller flange focal distance. Thus, the range of application of camera systems is increased by the use of the intermediate adapter of the invention. Furthermore, the lens stop of the interchangeable lens is not used. Therefore, the aperture setting force is transmitted without loss, unlike the case where the stop of the interchangeable lens is operated through interlocking members in the intermediate adapter from the side of the camera body. In addition, the aperture device can be opened and closed in the range of from the fully open state to the fully closed state by releasing the control of the aperture opening degree regulating arrangement in the still picture photographing operation. Therefore, in the case where the intermediate adapter is used with a video camera, the video changeover device can achieve the video changeover operation irrespective of the set aperture value.

I claim:

1. An intermediate adapter for a camera for coupling an interchangeable lens having a small flange focal distance to a camera body having a large flange focal distance, comprising:
   an aperture device replacing a stop of said interchangeable lens and driven by an electric motor;
   aperture value data transmitting means for transmitting aperture value data set by an aperture value setting member provided for said interchangeable lens to said aperture device;
   aperture opening degree regulating means for regulating an aperture opening degree to a set aperture value according to said aperture value data thus transmitted in an aperture driving operation performed by said electric motor; and
   video changeover means for releasing said aperture opening degree regulating means to allow said aperture device to operate in a range of a fully open state to a fully closed state.

2. The intermediate adapter as claimed in claim 1, wherein said aperture device comprises:
   an aperture support ring rotatably supporting fulcrum pins of a plurality of aperture blades; and
   an aperture operating ring engaged with rotary pins of said aperture blades in such a manner that said aperture device is opened and closed as said aperture operating ring is turned, said aperture operating ring being turned by said electric motor.

3. The intermediate adapter as claimed in claim 1, wherein said aperture opening degree regulating means comprises:
   a cam surface formed on an aperture interlocking ring which is turned in association with an aperture value setting means of said interchangeable lens;
   a counterlever, the locking position of which is regulated by said cam surface; and
   an operating lever, the position of rotation of which is regulated by said counterlever to regulate the angle of rotation of said aperture operating ring.

4. The intermediate adapter as claimed in claim 1, wherein said video changeover means comprises:
   means for moving said operating lever to a position where said operating lever is free from said aperture operating ring.

5. The intermediate adapter as claimed in claim 2, wherein said aperture support ring is adapted to be turned by an F-value correcting ring adapted to correct a full-aperture diameter of said aperture device in said intermediate adapter according to a full-aperture F value of said interchangeable lens.

6. The intermediate adapter as claimed in claim 4, wherein said F-value correcting ring serves as said video changeover means, and when said F-value correcting ring is turned to a "VIDEO" position, said operating lever is moved to a position where said operating lever is free from said aperture operating ring.

7. The intermediate adapter as claimed in claim 6, wherein said F-value correcting ring comprises locking means for locking and unlocking said F-value correcting ring at different F value positions and/or at a video changeover position.

8. The intermediate adapter as claimed in claim 5, further comprising converter means for decreasing an amount of rotation of said F-value correcting ring and transmitting said amount of rotation thus decreased to said aperture supporting ring disposed between said aperture support ring and said F-value correcting ring.

* * * * *